United States Patent [19]
Brignac et al.

[11] 4,079,046
[45] Mar. 14, 1978

[54] MULTIPLE POLYESTERIFICATION PROCESS

[75] Inventors: Edmond P. Brignac, Decatur; Billy T. Hanvey, Guntersville, both of Ala.

[73] Assignee: Monsanto Company, St. Louis, Missouri, Decatur, Ala.

[21] Appl. No.: 692,700

[22] Filed: Jun. 3, 1976

[51] Int. Cl.$^2$ ............................................. C08G 63/12
[52] U.S. Cl. .................................................. 260/75 M
[58] Field of Search ..................................... 260/75 M

[56] References Cited

U.S. PATENT DOCUMENTS

| 3,487,049 | 12/1969 | Busot | 260/75 M |
| 3,506,622 | 4/1970 | Higgins | 260/75 M |
| 3,849,379 | 11/1974 | Jeurissen et al. | 260/75 M |
| 4,008,048 | 2/1977 | Hellemans et al. | 260/75 M X |

FOREIGN PATENT DOCUMENTS 1,001,787  8/1965  United Kingdom .............. 260/75 M Primary Examiner—Lucille M. Phynes
Attorney, Agent, or Firm—Robert L. Broad, Jr.

[57] ABSTRACT

A semi-continuous polyester esterification process employing continuous feeding and discontinuous withdrawal is combined with a plurality of batch polycondensation processes to produce outstanding polyester polymer with improved flexibility (of process and product) and efficiency.

19 Claims, No Drawings

MULTIPLE POLYESTERIFICATION PROCESS

BACKGROUND OF THE INVENTION

Polymeric linear polyesters are readily prepared by heating together dihydric alcohols or functional derivatives thereof and dibasic carboxylic acids or polyester-forming derivatives thereof such as acid halides, salts, or simple esters of volatile alcohols. Highly polymerized polyesters can be formed into filaments, fibers, films and the like which can be permanently oriented. The most widely known and most important commercially of the polymeric polyesters is that prepared by the condensation of terephthalic acid or dimethyl terephthalate and ethylene glycol.

Basically, there are two methods of producing polyester. The first and most common method is via the so-called "ester interchange" process wherein the dimethyl ester of the dicarboxylic acid is heated with and excess of glycol in the presence of an ester interchange catalyst to produce the bisglycol ester of the acid and alcohol, with excess ethylene glycol being distilled off. This product is then polycondensed with the elimination of glycol by heating the product with a catalyst at an elevated temperature and reduced pressures until the high molecular weight product is formed.

The second method employs the so-called "direct" or "acid esterification" process, whereby the dicarboxylic acid is heated with the glycol to form the diglycol ester and low oligimers thereof which can then be polycondensed by heating in the presence of a catalyst under reduced pressures to form a high molecular weight product. It is well recognized in the art that either of the major steps of either of these basic processes may be accomplished continuously or batchwise. With respect to the acid esterification approach, well known to be economically preferably over ester interchange, there are certain known advantages and disadvantages in the selection of either the continuous or batch for esterification with entirely different but equally important advantages and disadvantages in the selection of continuous or batch for polycondensation. Moreover there has been an understandable tendency to employ commercially systems selected on the basis of apparent continuity of operation. Logically a continuous esterification would seem to suggest a continuous polycondensation. A batch polycondensation would suggest a batch esterification. But the inherent disadvantages of batch esterification and continuous polycondensation, however well recognized in the prior art, by industries whose product end uses require the purity (low glycol ether content) of continuous esterification and the uniformity of batch polycondensation along with the economy of direct acid esterification (as opposed to ester interchange) have not led to a satisfactory functionally and cooperatively combined system employing the best selection of each phase, that is: continuous esterification and batch polycondensation which at the same time permits needed flexibility of operation.

Such a system would indeed be a significant advance in industries such as the textile industry where polymer quality is a most critical consideration.

SUMMARY OF THE INVENTION

According to this invention, it has been found that a suitably controlled continuous polyester acid esterification process can be effectively combined, utilizing disconutinuous withdrawal of the esterified intermediate, with selected batch polymerizations of the intermediate with other selected modifiers, additives and the like to produce a variety of polymers characterized by a notably low glycol ester content, high purity, as reflected by a high melting point, and good color brightness and whiteness.

It is an advantage of this invention that a single esterification product provides the major element of starting material for a plurality of batch polycondensation processes.

Another advantage of this invention is that flexibility of product is provided by facilitating addition of copolymers and additives at critical points in the overall polymerization process, by affording convenient addition points in selected batch polymerization processes without interferring with the common major element of polymer (ester, bis ester and low polymer) feed.

Yet another advantage of this invention is that the economy and ease of operation inherent in continuous acid-glycol polyester esterification, is combined with the known relative efficiency in attaining uniform molecular weight distribution inherent in polyester batch polycondensation processes.

Briefly, these advantages in combination are attained in a polyester polymerization process by continuously feeding a mixture of a dicarboxylic acid and a glycol into a reaction zone to produce a common uniform prepolymer having a carboxyl content of 350–950 $\mu$eq/g and an intrinsic viscosity of 0.06 to 0.14. The common prepolymer is then discontinuously withdrawn from the reaction zone and supplied as a major element of a starting material for several (at least two) batch polycondensation processes, with respect to at least one of which batch polycondensation processes, a minor element of a starting material which is different from the major element of starting material is supplied. Withdrawing the common prepolymer from the continuous esterification and supplying the same as a major element of a batch polycondensation process are preferably concomitant or without significant delay. The batch polycondensation processes are continued until polymers are produced having an intrinsic viscosity of at least about 0.45, as determined by measurements and calculations described below.

DESCRIPTION OF THE PREFERRED EMBODIMENT

The linear polyester contemplated in the practice of this invention is formed from dicarboxylic acid and glycol. Copolyesters and modifications of polyester are included. In a highly polymerized state, these polyesters and copolyesters can be formed into filaments and the like.

The polyesters and copolyesters specifically useful in the instant invention are those resulting from reacting one or more of the glycols of the series $HO(CH_2)_nOH$, in which $n$ is an integer from 2 to 10, with one or more dicarboxylic acids. Among the dicarboxylic acids useful in the present invention are terephthalic acid, isophthalic acid, sebacic acid, adipic acid, p-carboxyphenylacetic acid, succinic acid, p,p'-dicarboxybiphenyl, p,p'-dicarboxyphenylcarbanilide, p,p'-dicarboxyphenylthiocarbanilide, p,p'-dicarboxydiphenylsulfone, p-carboxyphenoxyacetic acid, p-carboxyphenoxybutyric acid, p-carboxyphenoxyvaleric acid, p-carboxyphenoxyhexanoic acid, p-carboxyphenoxyheptanoic acid, p,p'-dicarboxydiphenylmethane, p,p'-dicarboxydiphenylethane, p,p'-dicarboxydiphenyipropane, p,p'- dicarboxydiphenylbutane, p,p'-dicarboxydiphenylpentane, p,p'-dicarboxydiphenylhexane, p,p'-dicarboxydiphenylheptane, p,p'-dicarboxydiphenyloctane, p,p'-dicarboxydiphenoxyethane, p,p'-dicarboxydiphenoxypropane, p,p'-dicarboxydiphenoxybutane, p,p'-dicarboxydiphenoxypentane, p,p'-dicarboxydiphenoxyhexane, 3-alkyl-4-(beta-carboxyethoxy) benzoic acid, oxalic acid, glutaric acid, pimelic acid, suberic acid, azelaic acid and the dioxy acids of ethylene dioxide having the general formula

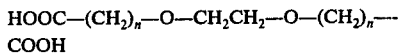

HOOC—$(CH_2)_n$—O—$CH_2CH_2$—O—$(CH_2)_n$—COOH wherein n is an integer from 1 to 4, and the like. Examples of the glycols which may be employed in practicing the instant invention are ethylene glycol, trimethylene glycol, tetramethylene glycol, decamethylene glycol cyclohexane dimethanol, and the like. Polyethylene terephthalate, however, is preferred because of the ready availability of terephthalic acid and ethylene glycol, from which it is made. It also has a relatively high melting point (cross filament fusion method) of from about 250° to 265° C. and this property is particularly desirable in the manufacture of filaments in the textile industry. The term "polyethylene terephthalate" is commonly used, and used herein, to include all copolymers and modified monomers containing at least about 85% by weight of ethylene terephthalate.

The above description, as will be seem, may include starting materials for the common prepolymer (major element) and/or minor elements of the starting material for the batch polycondensation processes.

Particularly suitable for the practice of this invention, with employment, conceivably as part of the common prepolymer, but much more typically as a minor element of starting material for any one of the several batch polycondensation processes, wherever appropriate for any one or more of the desired products, are chain branching compounds, and particularly those having a typical general formula: R—O[G—O]$_x$—H, where R is an alkyl group containing an average of from about 8–20 carbon atoms; G is a hydrocarbon radical selected from the group consisting of ethylene, propylene and isomers thereof, butylene and isomers thereof, and mixtures of the above; and x has an average value of from 8–20 and is about equal to or greater than R. By "average" is meant that the alkoxy glycol additive may comprise mixtures of the alkoxy glycol with some variances from the figures shown; but that the average of the integers in the mixture will be as indicated. Preferably, the R group contains 12–16 carbon atoms. The optimum degree of polymerization (x) is about 12–16. This additive may be used at concentrations of from about 0.25 to 3 mole percent, based on the weight of the dicarboxylic acid or ester-forming derivative thereof or on each polyester repeating unit. Preferably, the additive is present in amounts of from about 0.75 to 2 mole percent, based on the weight of the dicarboxylic acid or ester-forming derivative thereof or on each polyester repeating unit. The above mole percentages are based on the combination of both major and minor elements of the starting material.

Also suitable in the practice of this invention, and particularly so as part or all of a minor element of starting material for at least one of the batch polycondensation processes are the chain-branching agents, as taught in U.S. Pat. No. 2,895,946. These agents, which, among other purposes, are employed to increase the viscosity or molecular weight of the polyesters, are the polyols which have a functionality greater than two, that is to say, they contain more than two functional groups, such as hydroxyl. Examples of suitable compounds are pentaerythritol; compounds having the formula: R—(OH)$_n$ wherein R is an alkylene group containing from three to six carbon atoms, for example, trimethylol ethane, trimethylol propane, and the like compounds up to trimethylol hexane; and the compounds having the formula:

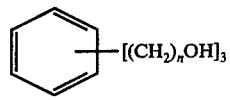

wherein n is an integer from 1 to 6. As examples of compounds having the above formula, there may be named 1,3,5-trimethylol benzene; 1,3,5-triethylol benzene; 1,3,5-tripropylol benzene; 1,3,5-tributylol benzene; and the like.

Aromatic polyfunctional acids or their esters may also be employed in this invention as chain-branching agents, and particularly those having the formula:

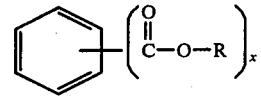

in which R is H or an alkyl group containing one to three carbon atoms and x is an integer of 3–6. As examples of compounds having the above formula, there may be named trimesic acid, trimethyl trimesate, and tetramethyl pyromellitate, and the like. In addition, there may be employed mixtures of the above acids and esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents may be employed in the preparation of the polyester and copolyesters in amounts ranging from 0 mole percent to 0.7 mole percent, based on the amount of dicarboxylic acid or ester-forming derivative thereof employed in the reaction mixture. If the chain-branching agent is tetrafunctional, as for example, pentaerythritol, quantities not in excess of 0.45 mole percent should be used. The preferred concentration of a tetra-functional chain-branching agent is about 0.2 mole percent. If a tri-functional chain-branching agent, such as for example, trimesic acid, is used, somewhat more is required for results equivalent to that of the tetra-functional chain-branching agent, and amounts up to 0.7 mole percent may be used. The preferred concentration of a tri-functional chain-branching agent is 0.5 mole percent. Concentrations, as herein expressed are based on the combination of the major and the minor elements.

Other starting materials particularly suitable for use in the practice of this invention, with particular reference to a minor element of starting material for at least one of the batch polycondensation processes are additives enhancing dyeability of fibers such as those providing a sulfonate group as a substituent of a repeating radical with the radical comprising the minor proportion of the total of the polyester. Such polyesters are taught in U.S. Pat. No. 3,018,272 where the polyester reaction is conducted in the presence of a small amount of a difunctional agent which possesses a metallo sulfonate group or sulfonateforming group and two functional or reactive groups such as hydroxyl or carboxyl and esters thereof. With respect to this basic dyeable polyester, U.S. Pat. No. 3,900,527, describes continuously or non-continuously reacting under polyesterification conditions an aromatic dicarboxylic acid and a polymethylene glycol to form a prepolymer having a carboxyl level of not more than 2000 μeq/g and an intrinsic viscosity of not more than 0.07 which is then reacted non-continuously with a glycol solution of a bis glycol ester of a difunctional aromatic compound possessing one or more metallo sulfonate groups and of such concentration that the resulting glycol/dicarboxylic acid moiety ratio is at least about 1.6. Excess glycol is removed and polymerization is completed in the usual manner. The polymer obtained is equivalent to polymers obtained using dimethyl terephthalate as a starting material, but does not contain the excessive glycol ether content which is otherwise characteristic of cationic dyeable polyesters prepared from terephthalic acid.

The teaching of U.S. Pat. No. 3,900,527 is hereby incorporated by reference.

Other additive materials particularly suited for use in the practice of the instant invention [with particular reference to a minor element of the starting material] in any one or more of the selected batch polycondensation processes include, for example, any one or more of the dicarboxylic acids and/or glycols, mentioned above, and any of the many fire retardant additives and/or ingredients so far known to be suitable for use in polyesters, including, phosphine oxides, phosphates, and phosphonates such as the following:

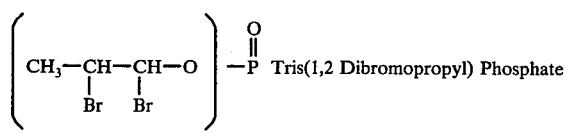
Tris(1,2 Dibromopropyl) Phosphate $R_3-\overset{O}{\underset{\|}{P}}$ Phosphine Oxides R=phenyl, octyl, butyl

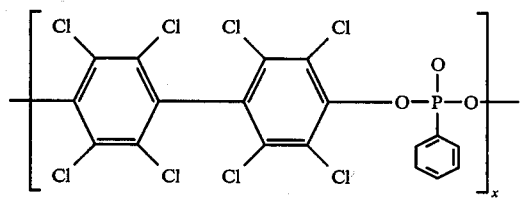
Poly(octachlorobiphenyl) phenyl phosphonate

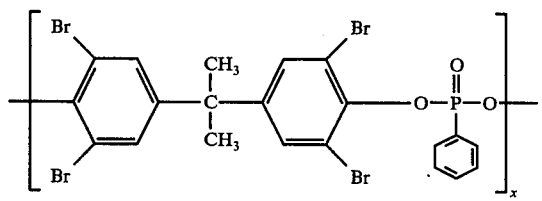
Poly(tetrabromobisphenol A) phenyl phosphonate

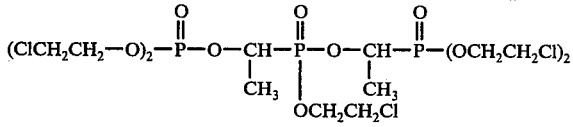
Chloroethyl ester of phosphite-phosphonate

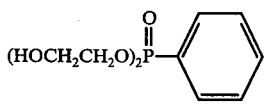
Bis(hydroxyethyl) phenyl phosphonate

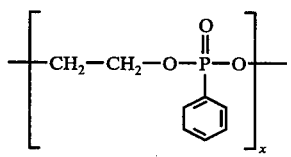
Poly(ethylene) phenyl phosphonate where x is the degree of polymerization and may include ranges of 1-100.

Considering the many known variations of starting materials, apparatus, reaction conditions and numerous combinations thereof, it is appropriate to give general parameters and considerations useful in practicing the instant invention.

The esterification reactor may be of any type known in the art. The feed make-up of the reactor, subject to qualifications described below, is of any known combination suitable for direct esterification. As is well known in the art, the dicarboxylic acid and the glycol selected may be added to the reaction vessels separately or mixed together and then added to the reaction vessel. Preferably the reactor is fed at a constant rate of starting materials and a constant level of fluctuation between discontinuous withdraws of the common prepolymer can be and is maintained. Catalysts may be employed or not as desired. Initial superatmospheric starting pressures may or may not be used to initiate the reaction between the acid and the glycol, and the entire esterification reaction may or may not be conducted under pressure, although the practice of the instant invention is entirely suitable for the normally preferred esterification at atmospheric pressure. A solvent comprised of low molecular weight glycol esters of the dicarboxylic acid used and polymers thereof may be employed in lieu of or in addition to starting pressures to facilitate the reaction. Esterification of the common prepolymer preferably includes partial condensation of the glycol and recycle of unreacted glycol to the feed stream of the esterifier.

As used herein, the term polymerizer, esterifier or esterification reactor includes any polymerization reactor employed during the esterification phase, and the term finisher is limited in meaning to a polymerization reactor in which the ultimate polymerization step in a polyester process is conducted.

Preferably, the major element is filtered before being combined with a minor element and fed to a finisher.

For product uniformity, all finishers are of the same or similar design, preferably to include a variable speed agitator and a variable temperature jacket.

Specific viscosity ($\eta$sp) is measured at a given concentration: ½ g. of the polymer per deciliter of a solvent having a weight ratio: 60% phenol/40% tetrachloroethane, by measuring the efflux time using a conventional (modified Ostwald-Cannon-Fenske) viscometer. Efflux time of the solvent is measured similarly and the specific viscosity can then be calculated.

Intrinsic viscosity ($\eta$) is calculated using the relationship:

$$\eta = \frac{\sqrt{2}}{C}[\eta\text{sp} - \ln\eta_{rel}]^{\frac{1}{2}}$$

where $\eta_{rel} = 1 + \eta\text{sp}$

Certain general rules concerning reactor conditions are applicable to all types of reactors. It is well known for example that as the temperature and pressure increases, other conditions remaining constant, the rate of esterification will increase. It is also known that at atmospheric pressure and any temperature beyond the melting point of the ester reactants, a product residence time can be selected so that a single vessel esterifier will produce a prepolymer product of an average molecular construction of less than about 1800 units. For most reactors it would suffice, in selecting optimum conditions for producting prepolymers within the critical range of carboxyl concentration, to select the normally desirable atmospheric pressure and a temperature which will favor a reasonably high reaction rate without causing an intolerable glycol ether concentration in the prepolymer. Having selected the pressure and tentatively selected the temperature, by employing an arbitrary but conservatively high input molar ratio of glycol to dicarboxylic acid, the product residence time can then be reduced from an arbitrary preselected high in order to permit downward adjustment of the carboxyl/hydroxyl ratio or the carboxyl content. If such a downward adjustment should result in an excess of glycol ether in the system, the molar ratio of the input feed slurry should accordingly be reduced.

As changes are made in operating conditions, while selecting optimum conditions, samples of the prepolymer product may be analyzed for carboxyl concentration and molecular weight. As is well known in the art, the carboxyl end group concentration can be determined by titration of the prepolymer with potassium hydroxide. When continuous polymerization has been conducted at constant feed volume, number average molecular weight can be calculated by stoichiometry, and, under conditions of varying feed quantities, by material balance or by vapor pressure osmometry, as is well known in the art.

Within the framework of the above, the following general rules apply in order to produce outstanding results in accordance with this invention. The mole feed ratio of the glycol to dicarboxylic acid into the polyesterification reaction zone must be at least 1/1, with injection of the glycol, if necessary, throughout to maintain a glycol/dicarboxylic acid mole ratio of at least 1.02. The esterification reaction should be conducted at no more than about 3.0 psig (91.49 cm Hg). A polycondensation catalyst may be included in the amount of about 75–160 parts of metal per million of the polymer in the esterification feed mixture or as all or a part of the minor element of starting material for any one or all of the batch polycondensation processes.

As is well known in the art, titanium dioxide is almost universally employed as a delustrant in the production of apparel fibers, and although data in support of this invention is based upon the use of titanium dioxide, it is understood that other similar-functioning delustrants may be employed.

It is important in the practice in the instant invention to eliminate objectionable organic contamination, common sources of which, in processes of this type, lie in degraded polymer returning to the system from overheads, and highly crystalline polymer which may result from the solidification of some polymeric material at cold spots in the process. The degraded material can be avoided simply by minimizing the overhead spaces from which the degraded polymer may fall to return to the mix. The highly crystalline polymer which forms in the cold spots, and sluffs off as impurities in the mix may be avoided by preventing any cold spots through the heating of these positions.

This invention also envisions a system, substantially free of unbound phosphorous for textile end uses because even small amounts of phosphorous will adversely affect the spinning pack life. For best results, no more than about 15 parts per million and preferably less phosphorous should be present in the polymer in unbound form.

The discontinuous withdrawal of the common prepolymer from the esterification reaction zone with concomitant supply of the withdrawn common prepolymer as a major element of starting material for one of the batch polycondensation processes should be conducted rapidly for the reason that the longer the period of withdrawal of the common prepolymer from the polyesterification reaction zone, the greater the lack of uniformity of the starting common prepolymer and of the resulting polymer. The minor element of starting material for any one or more of the batch polycondensation processes may already be in the batch finisher at the time of introduction of the withdrawn common prepolymer.

The following example is cited to illustrate the invention. It is not intended to limit it in any way.

EXAMPLE

A continuous esterifier reactor is operated while being fed continuously from a feed make up tank with 1620 grams terephthalic acid, 1520 grams of ethylene glycol, 1.0 grams of antimony glycoloxide, 19.7 grams of an alkoxy polyoxyalkalene glycol chain terminator having a general formula R — O[G—O]$_x$—H where R equal 14–15 and $x$ equal 14, 0.02 grams pentaerythritol, and 0.04 grams lithium acetate per ten 316 g. polycondensation batches. The mixture is esterified at a pressure of 15.1 pounds per square inch (psi) (½ psi gauge) (785.5 mm mercury) by heating for an average holding time of 90 minutes at a temperature of 240° C. during which time water and ethylene glycol are continually removed. The resulting common prepolymer has an intrinsic viscosity 0.081 and carboxyl level of about 370 μeq/g. A one-tenth portion of the above described common prepolymer is rapidly removed, filtered and supplied to a batch finisher having a variable speed agitator and variable temperature jacket in which is contained 37.6 grams of a 24% solution in ethylene glycol of the bis glycol ester of 5-sodium sulfo isophthalic acid. Temperature is increased in the finisher to remove excess ethylene glycol and polymerization is completed under nitrogen at a temperature of 280° C. at a pressure of less than 1 mm. The polymer obtained after 180 minutes of polycondensation time has a specific viscosity of 0.275, an intrinsic viscosity of 0.55 and a DTA (differential thermal analysis) melting point of 250° C.; and contains 0.65 weight percent diethylene glycol (DEG). The polymer is spun and drawn 5.1 times to a yarn of excellent whiteness. Microscopic examination reveals no aggregates of the dye additive present in the yarn. The fiber dyes to a dark shade with Sevron Blue 2G (CI Name: Basic Blue 22; no CI number) cationic dye.

A second one-tenth portion of the common prepolymer is batch polycondensed to a specific viscosity of 0.275 (intrinsic viscosity of 0.55) under the same conditions as above but without combining with it a minor element of starting material for the batch polycondensation, (such as the 5-sodium sulfo isophthalic acid with which the first portion of the common prepolymer was combined). The product had a DTA melting point of 247° C, a DEG content of 1.95 weight % and good brightness and whiteness.

We claim:

1. A polyester polymerization process comprising in combination
   (1) continuously feeding a mixture comprising a dicarboxylic acid and a glycol into a polyesterification reaction zone for esterification to produce a common prepolymer having a carboxyl content of 350 to 950 μeq/g and an intrinsic viscosity of 0.06 to 0.14; and
   (2) discontinuously withdrawing the common prepolymer from the reaction zone;
   (3) supplying the withdrawn common prepolymer as a major element of starting material for a plurality of batch polycondensation processes;
   (4) combining the major element with a minor element of starting material for at least one of the batch polycondensation processes; and
   (5) continuing the batch polycondensation processes to produce linear polyester having an intrinsic viscosity of at least about 0.45.

2. The process of claim 1 wherein the major element consists of at least 85% by weight of an ester of terephthalic acid and ethylene glycol.

3. The process of claim 2 wherein a minor element includes about 0.25–3 mole percent based on the weight of the acid, of a chain terminating compound having the general formula:

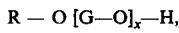

R — O [G—O]$_x$—H, where R is an alkyl group containing 8–20 carbon atoms; G is a hydrocarbon radical selected from the group consisting of ethylene, propylene and isomers thereof and butylene and isomers thereof, and X is an integer having a value from 8–20 and is about equal to or greater than the number of carbon atoms in R.

4. The process of claim 3 wherein the chain terminating compound having a typical general formula:

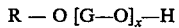

R — O [G—O]$_x$—H is present in the linear polyester at from about 0.75 to 2 mole percent, based on each polyester repeating unit, and R is an alkyl group containing an average of 12–16 carbon atoms, G is an ethylene radical, and $x$ has a value of 14.

5. The process of claim 2 wherein one of the elements includes up to about 0.45 mole percent, based on the amount of the terephthalic acid, of a tetra-functional chain-branching agent.

6. The process of claim 2 wherein one of the elements includes up to about 0.7 mole percent based on the weight of terephthalic acid, of a tri-function chain-branching agent.

7. The process of claim 6 wherein the chain-branching agent is trimesic acid.

8. The process of claim 6 wherein the chain-branching agent is pentaerythritol, in an amount of about 0.2 mole percent, based on the weight of the terephthalic acid.

9. The process of claim 1 wherein at least two different minor elements are employed.

10. The process of claim 1 wherein a minor element includes a bis glycol ester of a difunctional aromatic compound possessing a metallo sulfonate group.

11. The process of claim 10 wherein the aromatic compound possessing a sulfonate acid group is 5-sodium sulfo isophthalic acid.

12. The process of claim 1 wherein the major element of starting material is supplied to a batch polycondensation process at a temperature of about 265°–295° C.

13. The process of claim 1 wherein the continuous esterification takes place in a vessel to which there is a constant feed of starting materials and a constant level fluctuation between discontinuous withdrawals of the common prepolymer.

14. The process of claim 1 wherein the batch polycondensation takes place in the presence of preheated nitrogen.

15. The process of claim 1 wherein the major element is filtered before being combined with the minor element.

16. The process of claim 1 wherein at least one batch polycondensation takes place in a finisher having a variable speed agitator.

17. The process of claim 1 wherein at least one batch polycondensation takes place in a finisher having a variable temperature jacket.

18. The process of claim 1 wherein esterification of the common prepolymer includes partial condensation of the glycol and recycle to the feed stream of an esterifier.

19. The process of claim 1 wherein the prepolymer has a carboxyl level of about 500–900 µeq/g, an intrinsic viscosity of about 0.07, and at least one minor element is a glycol solution of a bis glycol ester of a difunctional aromatic compound possessing a metallo sulfonate group of such concentration that when the bis glycol ester is mixed with the major element, the resulting glycol/dicarboxyl acid moiety ratio is at least about 1.6.

* * * * *